United States Patent [19]

Beisswenger et al.

[11] Patent Number: 4,817,563
[45] Date of Patent: Apr. 4, 1989

[54] FLUIDIZED BED SYSTEM

[75] Inventors: Hans Beisswenger, Mahwah, N.J.; Ronald Knoche, Frankfurt; Wolfgang Frank, Eschborn, both of Fed. Rep. of Germany

[73] Assignee: Metallgesellschaft Aktiengesellschaft, Frankfurt am Main, Fed. Rep. of Germany

[21] Appl. No.: 160,370

[22] Filed: Feb. 25, 1988

[30] Foreign Application Priority Data

Feb. 28, 1987 [DE] Fed. Rep. of Germany ....... 3706538

[51] Int. Cl.⁴ .............................................. B09B 3/00
[52] U.S. Cl. ................................. 122/4 D; 110/245; 165/104.16
[58] Field of Search ....................... 122/4 D; 431/170; 110/245; 165/104.16

[56] References Cited

U.S. PATENT DOCUMENTS 3,908,284  9/1975  Beranek et al. .
4,165,717  8/1979  Reh et al. .
4,330,502  5/1982  Engström .................. 431/170 X
4,753,177  6/1988  Engström et al. ............. 122/4 D X

FOREIGN PATENT DOCUMENTS 0041648  5/1981  European Pat. Off. .

OTHER PUBLICATIONS

Patent Abstracts of Japan, Band 7, Nr. 95 (M-209), [1240], Apr. 21, 1983.
JP-A-58 19 614 (Babcock Hitachi K.K.), Feb. 4, 1983.

Primary Examiner—Edward G. Favors
Attorney, Agent, or Firm—Felfe & Lynch

[57] ABSTRACT

Disclosed is a fluidized bed system which includes a fluidized bed reactor, a solids separator and a return line and serves to carry out exothermic processes in a circulating fluidized bed for large thermal capacities. Secondary gas is introduced into the reactor on a level which is at least 1 meter above the bottom of the reactor. The fluidized bed system is provided with one or more displacing bodies, which cover 40 to 75% of the bottom surface area of the fluidized bed reactor and have a maximum height that is equal to one-half of the height of the reactor to ensure a satisfactory transverse mixing of the oxygen-containing secondary gas and fuel in reactors having large dimensions.

7 Claims, 3 Drawing Sheets under the displacing body. The displacing body may be provided with passages which have the same function as the inlets extending through the wall of the reactor.

FLUIDIZED BED SYSTEM

BACKGROUND OF THE INVENTION

The present invention is in a fluidized bed system for carrying out exothermic processes in a circulating fluidized bed. The system comprises a fluidized bed reactor, a solids separator and a return line. Additionally, the system includes lines for supplying oxygen-containing primary gases through the bottom of the fluidized bed reactor, lines for supplying oxygen-containing secondary gases on a level which is at least 1 meter above the bottom of the reactor but not in excess of 30% of the height of the reactor, and a fuel line, which opens into the fluidized bed reactor between the primary and secondary gas inlets.

Processes and plants which use circulating fluidized beds, particularly for a combustion of carbonaceous materials, have proved to be most advantageous and are superior for many reasons to processes and plants in which so-called orthodox fluidized beds are employed.

The basic process for combustion in a circulating fluidized bed has been described in U.S. Pat. No. 4,165,717. In that process the combustion is effected in two stages and the heat of combustion is dissipated via cooling surfaces disposed so as to contact the solids of the fluidized bed reactor above the secondary gas inlet. One of the special advantages of that process is that the combustion process can be adapted in a technically simple manner to the power requirement by the control of the suspension density in the upper portion of the reactor space and of the heat transfer to the cooling surfaces in contact with the fluid bed solids..

In U.S. Pat. No. 4,111,158 a combustion process is described in which a circulating fluidized bed also is employed. In that process a portion or all of the heat of combustion is extracted in an external fluidized bed cooler, which succeeds the fluidized bed reactor. The cooled solids are recycled in order to maintain a substantially constant temperature in the fluidized bed reactor. In the latter process an adaptation to the power requirement can be achieved by increasing or decreasing the rate at which solids are passed through the external fluidized bed cooler and then recycled to the fluidized bed reactor.

Whereas the processes outlined hereinbefore have proved highly satisfactory, the current trend toward increased power generation involve certain difficulties in the plant design. For larger thermal capabilities, larger reactor dimensions and particularly larger reactor cross-sections are required (e.g. above about 300 $MW_{th}$ corresponding to a reactor area of above about 50 $m^2$.) Due to the larger reactor dimensions and/or reactor cross sectional area, it is difficult to achieve a satisfactory transverse mixing of fuel and the like and oxygen-containing secondary gas throughout the total area of the fluidized bed reactor adjacent to the inlet means. As a result, a considerable part of the reaction occurs in the upper portion of the reactor and an afterburning may undesirably take place after the solids and gas have been separated in the solids separator.

It is an object of the invention to provide a fluidized bed system which comprises a fluidized bed reactor, a solids separator and a return line and serves to carry out exothermal processes in a circulating fluidized bed and which ensures a satisfactory operation even during a generation of a high thermal power.

SUMMARY OF THE INVENTION

The above object and others are obtained in that the fluidized bed system, as described above is provided with one or more displacing bodies. The one or more displacing bodies cover 40 to 75% of the bottom surface or primary air grid area of the fluidized bed reactor and have a maximum height that is equal to one-half of the height of the fluidized bed reactor. The one or more displacing bodies are responsible therefor that only 25 to 60% of the bottom surface of the fluidized bed reactor are effective as grid area. In comparison hereto the bottom surface which is defined by the reactor dimension would be effective to 100% in the absence of displacing bodies.

The geometric configuration of the displacing body can be chosen as desired within a large range. For instance, in a fluidized bed reactor which is circular in cross-section the displacing body may have the shape of a cylinder or of a frustum of a cone and in that case the center of the circular base may be disposed adjacent to the center of the bottom surface of the reactor.

In a reactor which is rectangular in cross-section the displacing body may have the shape of a dam, the ends of which may adjoin parallel reactor walls so that the dam virtually divides the lower portion of the reactor space into two separate chambers. Two dams may be provided, which extend virtually at right angles to each other and which may adjoin the reactor walls so as to divide the lower portion of the reactor space into four separate chambers.

Irrespective of the geometrical configuration of the displacing body, the latter should suitably cover the center of the bottom of the fluidized bed reactor. If secondary gas is supplied through inlets extending through a wall of the fluidized bed reactor the displacing body has a height such that it rises above the secondary gas inlet. In the case that secondary gas is supplied on a plurality of superimposed levels the displacing body has to extend at least above the lowermost secondary gas inlet level. According to a preferred embodiment of the invention the displacing body has a height so that it extends above the uppermost secondary gas inlet level.

The cross sectional area of the displacing body may be constant over its height or may be upwardly decreasing.

The displacing body in the reactor in effect forms segmented or multichamber sections in the lower reactor. Each of the segments or chambers formed in the lower region of the reactor is charged separately through one or more charging mechanisms. Preferably the feed is charged pneumatically.

The displacing body may be constructed of a refractory material which is conventional in furnace construction. Alternatively it may be made of diaphragm or fin walls. That side of the body which faces the fluidized bed reactor may be protected by a covering consisting of a refractory material. The one or more displacing bodies are firmly connected to the reactor thus forming a constructive unit.

In a preferred embodiment of the invention the fluidized bed system comprises one or more displacing bodies provided with secondary gas inlets, which are optionally provided on a plurality of levels. In that embodiment of the invention the individual chamber or chamber portion may be supplied with secondary gas through inlets which are provided in the wall and/or in the interior of the fluidized bed reactor to insure an optimum admixing of the secondary gas.

In another preferred embodiment of the invention, the displacing bodies having an upwardly decreasing crosssectional area. As a result and in conjunction with the embodiment described just before, the velocity of flow in the reactor region that is provided with the displacing body may be maintained within certain limits in spite of the supply of secondary gas.

In an orthodox fluidized bed, a dense phase is separated by a distinct density step from an overlying gas space. A circulating fluidized bed, such as is used in the present fluidized bed system, differs in that there are states of distribution without a defined boundary layer. There is no density step between a dense phase and an overlying gas space and the solids concentration in the reactor decreases from bottom to top.

If the operating conditions are defined by the Froude and Archimedes numbers, the following ranges will be obtained:

$$0.1 \leq 3/4\, Fr^2 \times \frac{\rho_g}{\rho_k - \rho_g} \leq 10$$

or $$0.01 \leq Ar \leq 100$$

wherein $$Ar = \frac{d_k^3 \times g(\rho_k - \rho_g)}{\rho_g \times v^2}$$

$$Fr^2 = \frac{\mu^2}{g \times d_k}$$

and
u relative gas velocity in m/s
Ar Archimedes number
Fr Froude number
$\rho_g$ density of gas in kg/m$^3$
$\rho_k$ density of solid particle in kg/m$^3$
$d_k$ diameter of spherical particle in meters
$v$ kinematic viscosity in m$^2$/s
g constant of gravitation in m/s$^2$ The exothermic reaction is carried out in two stages with oxygen-containing gases supplied on different levels. Such a method of operation results in a "soft" combustion which does not produce hot spots and substantially suppresses NO$_x$ formation. The upper inlet for oxygen-containing gas should be positioned sufficiently above the lower inlet such that the oxygen contained in the gas supplied on the lower level is substantially consumed before it reaches the upper level.

If steam is desired as a carrier of process heat, the invention can be carried out in such a manner that a mean suspension density of from about 15 to 100 kg/m$^3$ is provided above the upper secondary gas inlet level by a suitable adjustment of the fluidizing and secondary gas rates. The released heat is removed by heating surfaces disposed to contact the solids of the fluidized bed above the uppermost secondary gas inlet means and/or on the wall of the fluidized bed reactor. Such a mode of operation has been described in more detail in U.S. Pat. No. 4,165,717.

The gas velocities adjusted in the fluidized bed reactor above the secondary gas inlet usually exceed 5 meters per second under atmospheric pressure and may be as high as 15 meters per second. The ratio of the diameter or cross section to the height of the fluidized bed reactor should be selected so as to provide a reactor gas residence time of from 0.5 to 8.0 seconds, preferably 1 to 4 seconds.

Preferably the secondary gas is introduced through a plurality of secondary gas inlets on each secondary gas inlet level.

One of the advantages obtained by the above-described mode of operation is that the rate at which process heat is recovered can be varied in a simple manner by changing the suspension density in the furnace space in the fluidized bed reactor above the secondary gas inlet.

Operation under certain conditions involving a supply of fluidizing gases and secondary gases at predetermined volume rates and with a resulting predetermined mean suspension density will result in a predetermined heat transfer rate. The rate of the heat transfer to the cooling surfaces will be increased if the suspension density adjacent to the cooling surfaces is increased by an increase of the rate of fluidizing gas and, if desired, also of the rate of secondary gas. Due to the higher heat transfer rate, heat can be generated at a higher rate even though the combustion temperature may be virtually constant. The higher oxygen demand required for the generation of a thermal power is virtually automatically met because the fluidizing gas and, if desired, also the secondary gas is supplied at a higher rate in order to increase the suspension density at the cooling surfaces.

In an analogous manner the thermal power can be adjusted to a lower process heat demand by a decrease of the suspension density in the furnace space in the fluidized bed reactor above the secondary gas inlet. The lower suspension density results in lower heat transfer so that less heat is extracted from the fluidized bed reactor. In that manner the combustion rate is decreased with little or no change in temperature.

The feedstock, which is capable of an exothermic reaction, is charged through one or more charging systems, e.g., by pneumatic injection so that each of chambers or of the chamber segments formed in the lower region of the fluid bed reactor are charged separately.

In another embodiment of the invention the fluidized bed system includes at least one fluidized bed cooler connected by solids supply and solids return lines. A mean suspension density of from 10 to 40 kg/m$^3$ is maintained in the fluidized bed reactor above the upper secondary gas inlet by a suitable control of the rates of fluidizing and secondary gases. Hot solids are withdrawn from the circulating fluidized bed and are cooled in a fluidized state by direct and indirect heat exchange. At least a partial stream of the cooled solids is returned to the circulating fluidized bed. That embodiment has been explained in more detail in U.S. Pat. No. 4,111,158.

In the above-described method the temperature can be maintained constant virtually without a change of the operating conditions maintained in the fluidized bed reactor, for instance, without a change of the suspension density and other parameters, by controlling the withdrawal of hot solids and the recycle of cooled solids to the circulating fluidized bed. The rate at which cooled solids are recycled will depend on the thermal power demand and the adjusted reaction temperature. The temperature may be varied from temperatures just above the ignition point to very high temperatures, which are limited, e.g., by the softening points of the reaction residues. The temperatures may lie, e.g., between about 450° and 950° C.

Because a major portion of the heat generated by the exothermic reaction is extracted in the fluidized bed cooler which succeeds the fluidized bed reactor in the solids flow path, that process affords a further advantage in that a low suspension density may be maintained in the fluidized bed reactor above the secondary gas inlet so that the pressure drop throughout the fluidized bed reactor will be comparatively low. Heat is extracted in the fluidized bed cooler under conditions which result in an extremely high heat transfer rate, e.g., in a range of from 300 to 500 watts/$m_2$.° C.

The temperature in the fluidized bed reactor is controlled in that at least a partial stream of cooled solids are recycled from the external fluidized bed cooler to the fluidized bed reactor. For instance, the required partial stream of cooled solids may be charged directly into the fluidized bed reactor. In addition, the exhaust gas from the solids separator may be cooled by an addition of cooled solids, which may be supplied from the fluidized bed cooler, e.g., to a pneumatic conveyor or to a suspension exchanger stage. These solids may subsequently be separated from the exhaust gas and be recycled to the fluidized bed cooler. In that case the heat content of the exhaust gas from the fluidized bed reactor will also be supplied to the fluidized bed cooler.

It is particularly desirable to recycle a partial stream of cooled solids from the fluidized bed cooler directly to the fluidized bed reactor and to use another partial stream of the cooled solids for cooling the exhaust gas. The solids are subsequently introduced into the fluidized bed reactor, too.

In that embodiment of the invention the gas residence times and the gas velocities above the secondary gas inlet under atmospheric pressure and the manner in which the fluidizing and secondary gases are supplied will correspond to the conditions maintained in the previously discussed embodiment.

The hot solids discharged from the fluidized bed reactor should be cooled in a fluidized bed cooler having a plurality of cooling chambers, through which the solids pass. The cooling chambers contain interconnected cooling registers. Coolant passes through the registers and chambers in a countercurrent direction to the hot solids. In that case the heat of combustion can be extracted by a relatively small quantity of coolant.

In another embodiment of the fluidized bed system with a succeeding fluidized bed cooler, the cooler is combined with the fluidized bed reactor in a unit of construction. In that case the fluidized bed reactor and the fluidized bed cooler comprise a common wall, which is suitably cooled and has a through opening for a supply of cooled solids into the fluidized bed reactor. In that case the fluidized bed cooler which is employed may comprise a plurality of cooling chambers, as has been mentioned hereinbefore, or it may consist of a plurality of units which are provided with cooling surfaces each unit having a wall in common with the fluidized bed reactor, which common wall has a passage opening for solids. Each of the units may also have a separate solids supply line. Such an apparatus has been described in U.S. Pat. No. 4,716,856.

An important feature of the embodiment utilizing a fluidized bed cooler is particularly due to the fact that almost any desired heat transfer fluid can be heated up in the fluidized bed cooler. From a technological aspect it is particularly important that steam in various stages can be generated and heat transfer salt may be heated up.

The oxygen-containing gases used within the scope of the invention may consist of air, oxygen-enriched air or commercially pure oxygen. Finally, the output can be increased by conducting the combustion under a superatmospheric pressure, e.g., under a pressure of up to 20 bars.

The fluidized bed system in accordance with the invention may basically be supplied with any material which is capable of a self-sustaining combustion. Examples of such materials are coals of any kind, particularly low-grade coals, such as coal washery refuse, sludge coal, high-salt coal, as well as brown coal and oil shale.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

DESCRIPTION OF PREFERRED EMBODIMENT

Figure 1A:
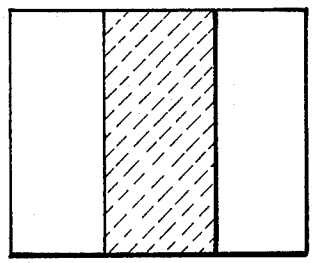
FIG. 1 (A–H) shows in plan view various displacing bodies which are circular or rectangular in cross-section and may be used in fluidized bed reactors.
Figure 1B:
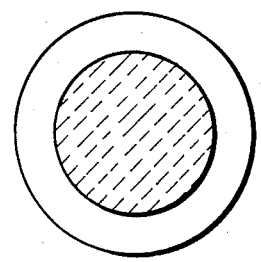
Figure 1C:
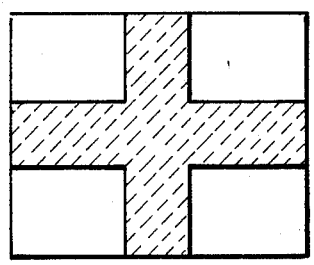
Figure 1D:
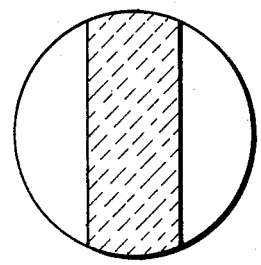
Figure 1E:
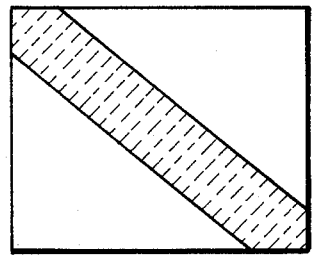
Figure 1F:
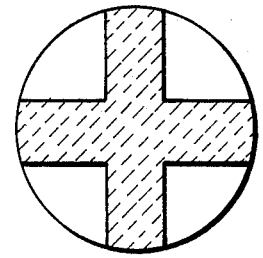
Figure 1G:
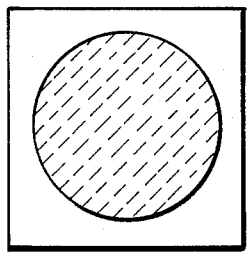
Figure 1H:
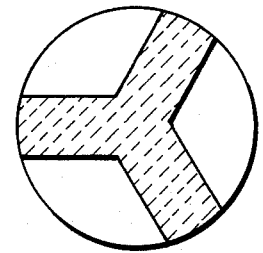
Figure 2:
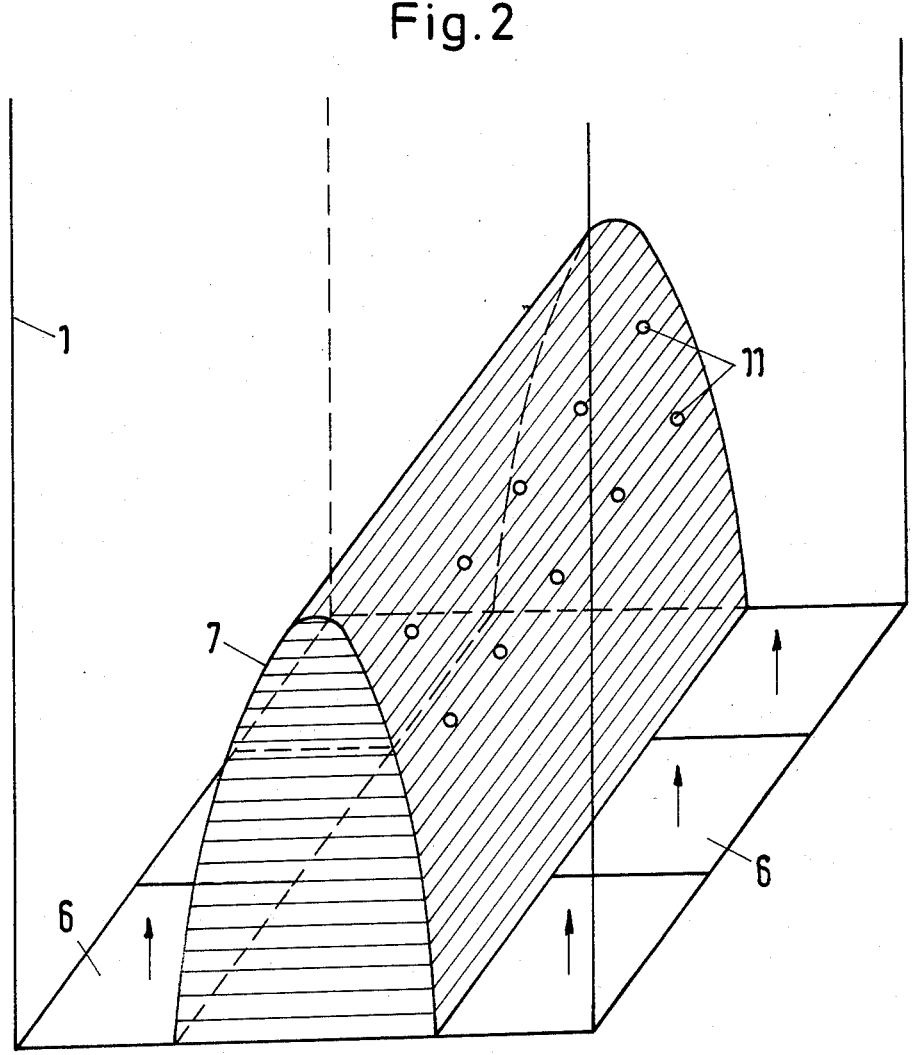
FIG. 2 is a perspective view showing the lower portion of a fluidized bed reactor provided with displacing bodies.

In FIG. 2, a fluidized bed reactor 1 is diagrammatically indicated. The bottom surface or primary air grid of reactor 1 is covered in part by a damlike displacing body 7 so that two fluidizing grates 6 are effectively provided. The top portion of the displacing body is formed with secondary gas inlet openings 11.

Figure 3:
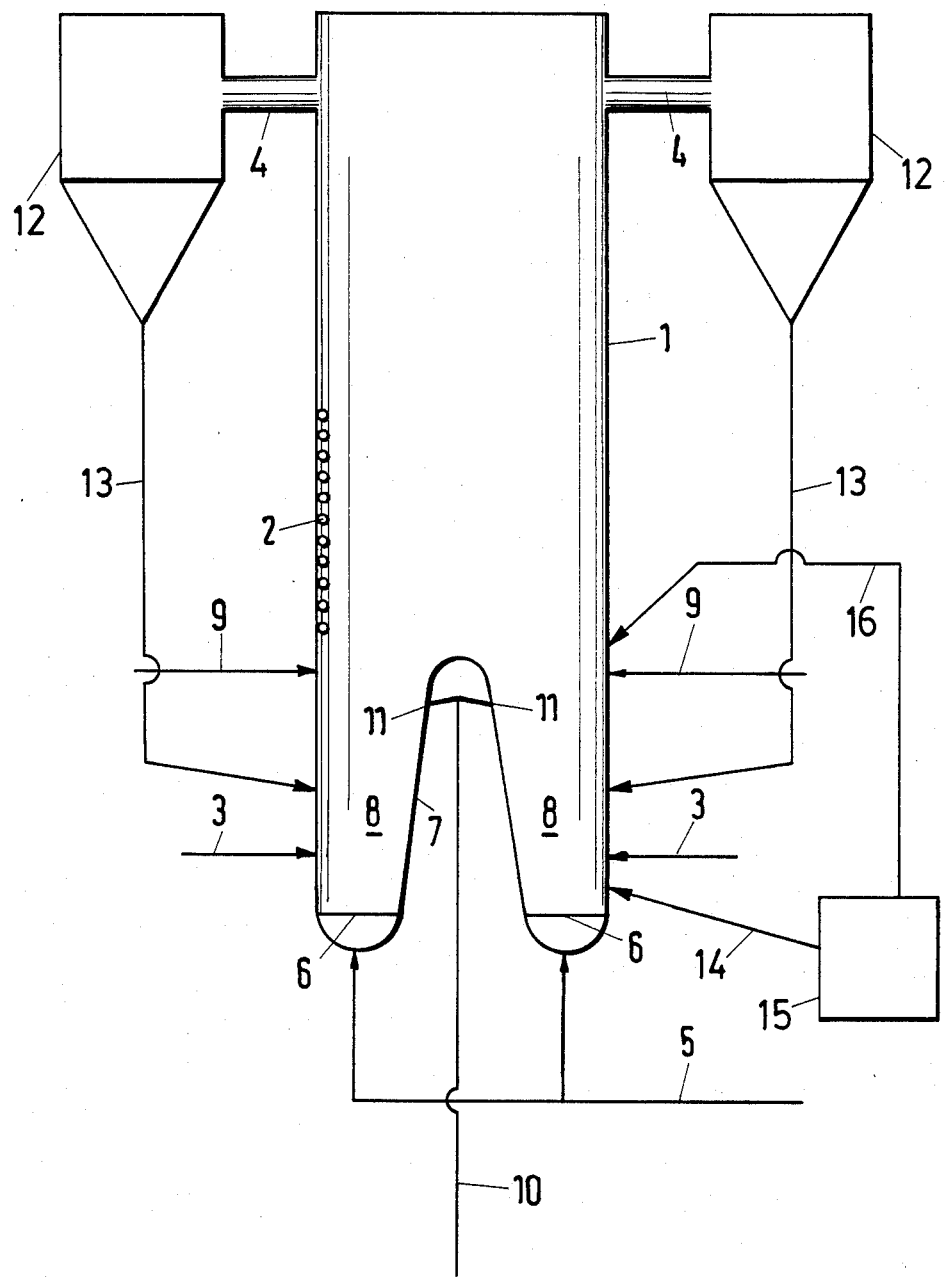
FIG. 3 is a longitudinal sectional view showing a fluidized bed reactor.

Referring to FIG. 3, the fluidized bed reactor 1 is provided with heating surfaces 2, which are indicated to constitute a diaphragm wall. The reactor 1 has a lower reactor chamber 8 which is divided by the displacing body 7 into two sections. Each section is supplied with oxygen-containing fluidizing gas through a line 5 and a fluidizing grate 6 and is supplied with fuel through lines 3. The reactor 1 is also supplied with oxygen-containing secondary gas through lines 9. Additional secondary gas is supplied through a line 10 and secondary gas inlet openings 11. A gas-solids suspension is withdrawn through a line and introduced into a cyclone separator 12 wherein solids are separated from the gas solids suspension and recycled to reactor 1 through recycle line 13. Schematically illustrated is that embodiment wherein hot solids are removed from reactor 1 through line 14 and introduced into a fluidized bed heat exchanger 15 from which the cooled solids can be recycled to the reactor via line 16.

EXAMPLE

Coal was combusted with the aid of air to generate saturated steam in a plant as shown in FIG. 3.

The fluidized bed reactor 1 of the fluidized bed system had a bottom surface of 12.8 meters × 10 meters. The reactor had a height of 40 meters. The bottom surface of the reactor was covered by a displacing body 7 having a base area of 7.6 meters×10 meters so that two chambers were provided, each of which was defined by a fluidizing grate 6 having a size of 2.6 meters×10 meters. The displacing body 7 had the shape of a dam having side faces which were inclined 75° from the horizontal. The crest of the dam was 1.5 meters above the secondary gas inlets 9, which were disposed 8.5 meters above the fluidizing grate 6.

The wall surface of the fluidized bed reactor 1 was completely lined with water-cooled diaphragm walls. The walls of the displacing body 7 consisted also of water-cooled diaphragm walls, which were protected by refractory material on those surfaces which faced the reactor.

Coal having a lower heating value of 246 MJ/kg and a mean particle diameter of 0.2 mm was supplied through lines 3 into the fluidized bed reactor 1 at a rate of 88,000 kg/h by being entrained by air, which was at 100° C. and supplied at a rate of 8800 sm$^3$/h. The fluidizing gas consisted of air at 255° C. and was supplied through the fluidizing grates 6 at a rate of 2×144,000 sm$^3$/h. Additional air at 260° C. was supplied through the secondary gas lines 9 at a rate of 250,000 sm$^3$/h. Additional air at 260° C. was supplied at a rate of 90,000 sm$^3$/h through the secondary gas inlet openings 11, which were disposed 7 meters above the fluidizing grates 6.

Under the selected operating conditions a temperature of 850° C. was maintained in the fluidized bed reactor 1. The suspension density below the secondary gas inlets 9 and 11 amounted to about 100 kg per m$^3$ of the reactor volume. By means of the heating surfaces 2, saturated steam at 140 bars was generated at a rate corresponding to a thermal power of 120 MW. Additional saturated steam at 140 bars, corresponding to a thermal power of 6 MW, was produced by means of the diaphragm walls of the displacing body 7.

It will be understood that the specification and examples are illustrative but not limitative of the present invention and that other embodiments within the spirit and scope of the invention will suggest themselves to those skilled in the art.

We claim:

1. A fluidized bed system comprising:
    a fluidized bed reactor, said reactor having a bottom and means for exhausting a gas from said reactor;
    means for introducing fluidizing gas into the bottom of said reactor;
    means for introducing a secondary gas into the reactor at a level of at least one meter above the bottom of the reactor but not in excess of 30% of the reactor height;
    means for introducing fuel into said reactor at a level between the means for introducing fluidizing and secondary gas into said reactor;
    a solids separator to remove solids from exhaust gas from said reactor;
    recycle means for returning the removed solids to said reactor;
    at least one displacing body to cover 40 to 75% of the bottom surface of said reactor, said least one displacing body having a height not in excess of one-half the reactor height.

2. The fluidized bed system of claim 1 wherein the means for introducing secondary gas into the reactor includes an uppermost secondary gas inlet.

3. The fluidized bed system of claim 2 wherein the at least one displacing body has a height so that it extends above the uppermost secondary gas inlet extending through a wall of the fluidized bed reactor.

4. The fluidized bed system of claim 1 wherein the least one displacing body is provided with secondary gas inlets, which are optionally provided on a plurality of levels.

5. The fluidized bed system of claim 1 wherein said least one displacing body has an upwardly decreasing cross-sectional area.

6. The fluidized bed system of claim 1 wherein a heating surface is disposed in contact with the solids of the fluidized bed in the reactor above the uppermost secondary gas inlet.

7. The fluidized bed system of claim 1 further comprising at least one fluidized bed cooler connected to said reactor by means for withdrawing hot solids from the reactor and by means for recycling cooled solids to the reactor.

* * * * *

UNITED STATES PATENT AND TRADEMARK OFFICE
CERTIFICATE OF CORRECTION

PATENT NO.   :   4,817,563

DATED        :   April 4, 1989

INVENTOR(S)  :   Hans Beisswenger et al

It is certified that error appears in the above-identified patent and that said Letters Patent is hereby corrected as shown below:

Column 6, line 54, following "line" insert --4--;

Column 7, line 16, "246" should read --24.6--.

Signed and Sealed this

Fifteenth Day of May, 1990

Attest:

HARRY F. MANBECK, JR.

Attesting Officer   Commissioner of Patents and Trademarks